(12) United States Patent
Graham

(10) Patent No.: US 7,640,698 B2
(45) Date of Patent: Jan. 5, 2010

(54) EMERGENCY VEHICLE SHELTER

(76) Inventor: Sandra Graham, 4937 Las Lomas Dr., Mesquite, TX (US) 75150

( * ) Notice: Subject to any disclaimer, the term of this patent is extended or adjusted under 35 U.S.C. 154(b) by 0 days.

(21) Appl. No.: 11/622,393

(22) Filed: Jan. 11, 2007

(65) Prior Publication Data

US 2007/0107762 A1 May 17, 2007

Related U.S. Application Data

(63) Continuation-in-part of application No. 10/842,084, filed on May 10, 2004, now abandoned.

(51) Int. Cl.
*B60N 99/00* (2006.01)
(52) U.S. Cl. .................... 52/2.17; 52/2.18; 52/2.22; 52/2.23; 52/3; 52/DIG. 12; 52/DIG. 14; 296/136.02; 150/166; 160/19
(58) Field of Classification Search ............ 52/2.11, 52/DIG. 12, DIG. 14, 2.17, 2.18, 2.22, 2.23, 52/3; 296/136.02; 160/19; 150/166
See application file for complete search history.

(56) References Cited

U.S. PATENT DOCUMENTS

| | | | | |
|---|---|---|---|---|
| 3,008,214 A | * | 11/1961 | Foster et al. ............... 52/2.18 |
| 4,097,947 A | | 7/1978 | Kiefer | |
| 4,280,239 A | | 7/1981 | Brown | |
| 4,294,483 A | * | 10/1981 | Ferris .................... 296/136.02 |
| 4,432,581 A | | 2/1984 | Guma | |
| 4,457,730 A | | 7/1984 | Foster et al. | |
| 4,498,881 A | | 2/1985 | Buckle | |
| 4,699,192 A | * | 10/1987 | Kamen et al. ............. 150/166 |
| 4,807,922 A | * | 2/1989 | Glover .................... 296/136.02 |
| 5,050,925 A | | 9/1991 | Brown | |
| 5,052,065 A | | 10/1991 | West | |
| 5,203,427 A | | 4/1993 | Williams et al. | |
| 5,242,206 A | * | 9/1993 | Heck ....................... 296/136.02 |
| 5,287,904 A | | 2/1994 | Smith et al. | |
| 5,401,074 A | | 3/1995 | Timerman | |
| 5,519,965 A | | 5/1996 | Robinson | |
| 5,664,825 A | * | 9/1997 | Henke et al. ............ 296/136.02 |
| D402,622 S | | 12/1998 | Rogers | |
| 5,890,525 A | * | 4/1999 | Shores ................... 296/136.02 |
| 5,941,594 A | | 8/1999 | O'Neill | |
| 6,044,881 A | * | 4/2000 | Welch et al. ................. 150/166 |
| 6,056,347 A | | 5/2000 | D'Adamo | |
| 6,070,629 A | * | 6/2000 | Whiteside .................... 150/166 |
| 6,099,067 A | * | 8/2000 | Butterworth ............ 296/136.07 |
| 6,192,633 B1 | * | 2/2001 | Hilbert ....................... 52/2.22 |
| 6,220,648 B1 | * | 4/2001 | Daniel .................... 296/136.02 |
| 6,340,198 B1 | * | 1/2002 | Benites et al. ........... 296/136.1 |
| 6,350,000 B1 | | 2/2002 | Van Benthem et al. | |
| 6,350,168 B1 | | 2/2002 | Kroll et al. | |
| 6,415,832 B1 | * | 7/2002 | Ricks .......................... 150/166 |
| 6,439,644 B1 | * | 8/2002 | Jester ..................... 296/136.02 |
| 6,491,335 B1 | * | 12/2002 | Cohill .................... 296/136.07 |
| 6,722,084 B2 | * | 4/2004 | Berman ....................... 52/2.11 |
| 6,964,446 B2 | * | 11/2005 | Porter ........................... 296/98 |
| 7,073,840 B1 | * | 7/2006 | Colmenero ............... 296/136.1 |

(Continued)

*Primary Examiner*—Richard E Chilcot, Jr.
*Assistant Examiner*—Matthew J Smith

(57) ABSTRACT

An emergency vehicle shelter designed for women, senior citizens, and/or individuals with limited disabilities in mind; including an inflatable unit configured for nested engagement with a vehicle for covering the vehicle's upper and outer surfaces. The unit may be inflated by a remotely activated inflation unit. Provision is made in the unit member to allow a vehicle operator to reenter the vehicle for shelter from inclement weather.

8 Claims, 1 Drawing Sheet

U.S. PATENT DOCUMENTS

| | | | |
|---|---|---|---|
| 7,182,391 B2 * | 2/2007 | Thrasher et al. | 296/136.02 |
| 7,243,975 B2 * | 7/2007 | Harcourt et al. | 296/136.02 |
| 7,360,820 B2 * | 4/2008 | Tellez | 296/136.02 |
| 2004/0178657 A1 | 9/2004 | Tellez | |
| 2005/0151391 A1 * | 7/2005 | Bryd | 296/136.1 |
| 2005/0246964 A1 | 11/2005 | Graham | |
| 2006/0260210 A1 * | 11/2006 | Tanielian et al. | 52/2.11 |

* cited by examiner

EMERGENCY VEHICLE SHELTER

CROSS-REFERENCE TO PRIOR APPLICATION

This application is a continuation-in-part of U.S. patent application Ser. No. 10/842,084, filed May 10, 2004 now abandoned.

BACKGROUND OF THE INVENTION

1. Field of the Invention

The present invention is generally directed toward vehicle covers. In particular, the present invention is directed toward a vehicle cover which may be quickly installed with minimal effort for the protection of the exterior surface of the vehicle in the event of a hazardous weather situation.

2. Background Information

A variety of vehicle covers are available for protecting a vehicle's exterior surface from environmental hazards. Typically, the conventional vehicle cover consists of a single ply of material to protect a vehicle's surface finish from the everyday environment experienced in a storage situation, such as sun, wind, rain, dust, and bird droppings, among other things. However, clearly something more is needed for protection from the more damaging effects of a hail storm or other hazardous weather situation.

Even a conservative estimate would place annual repair costs to vehicles from hail damage in the billions of dollars. In an effort to provide a solution, inventors have long attempted to fill the need of a vehicle cover that provides protection to the outer surface of the vehicle from the damaging effects of hail. However, the solutions provided in the prior art fall short of the optimum balance between quick and efficient deployment and maximum protection as needed in the event of a sudden hail storm.

In effect the prior art reveals two categories of vehicle covers for protecting the surface of a vehicle from the effects of a hail storm. These may adequately be referred to as (1) the padded cover and (2) the inflatable cover. Prior art falling in the padded cover category includes that described in U.S. Pat. Nos. 4,699,192; 4,807,922; 5,664,825; 6,070,629; and 6,220,648. Although no inflation is needed for these prior art covers, the covers themselves require the use of thick, heavy materials. While this does provide some protection for the vehicle, it also typically provides a bulky, heavy, difficult-to-install cover that is not suitable for an emergency covering of the vehicle body, particularly by a single individual.

The second category, or inflatable type of covers, includes those covers described in U.S. Pat. Nos. 4,294,483; 5,242,206; 6,044,881; 4,966,406; and 6,439,644. These car covers all integrate some type of inflatable envelope; however, all of these covers also fall short of the optimum, because they do not provide for single-user emergency deployment. For instance, U.S. Pat. No. 4,294,483 issued to Ferris discloses an inflatable vehicle cover, but the vehicle cover in Ferris is clearly not intended, nor capable of, emergency use. That is, although a single user may be able to place the deflated cover in Ferris onto a car in an emergency situation such as a hail storm, the individual would also be required to locate bungee strips provided in Ferris and attach them to the cover for proper fit to the vehicle. Next, the individual would need to locate an external air compressor (as is the disclosed mechanism for inflation in Ferris), inflate the Ferris cover to the proper level, and shut the compressor off. Finally, the individual would need to seek shelter elsewhere, as Ferris (and the other prior art examples) fails to provide for reentry into the vehicle for temporary protection from the storm.

In view of the limitations associated with the prior art, a substantial need exists for an inflatable vehicle cover for use in emergency situations, which is light, fully covers the vehicle, and allows an individual to re-enter the vehicle for temporary shelter from the elements. Applicant's invention, through a novel combination of component pieces, provides such a mechanism.

SUMMARY OF THE INVENTION

In view of the foregoing, it is an object of the present to provide an improved inflatable vehicle cover.

It is another object of the present invention to provide an inflatable vehicle cover that provides protection from the force of impacting foreign objects such as hail.

It is another object of the present invention to provide an inflatable vehicle cover for quick and easy deployment onto a vehicle for use in emergency situations.

It is another object of the present invention to provide an inflatable vehicle cover that may be inflated remotely.

It is another object of the present invention to provide an inflatable vehicle cover that automatically shuts off at the proper level of inflation.

It is another object of the present invention to provide an inflatable vehicle cover that allows for entry and exit of the vehicle after deployment.

In satisfaction of these and other related objectives, the present invention provides an inflatable vehicle cover for protecting the entire body of a vehicle from damage from the force of impacting foreign objects, such as hail. The cover is configured as an inflatable bladder, preferably heat sealed along the edges and in other strategic positions in order to create a plurality of air pockets, all in fluid communication with one another. The cover is ideally constructed of nylon, polyester, polypropylene, acrylic, or other light weight material as will render the cover an easily manageable size and weight. The cover will also preferably contain an integrated receptacle for placement of the cover's light weight inflation unit, which may be operated remotely via a remote control unit. The cover will optimally be configured to allow entrance into or exit from the vehicle, resealing via hook and loop fasteners or the like. The cover may also be configured of clear materials in the areas of vehicle windows to allow an individual seeking shelter inside the vehicle visual contact to monitor his or her surroundings. Finally, the cover of the present invention will contain elasticized edges and/or magnets or other latching mechanisms for retaining the cover in place on the vehicle.

In operation, it is foreseen that the present invention will be lightweight and small enough to stow in the trunk, tool box, or behind the seat of a vehicle. As the operator becomes aware of an impending hail storm or other hazardous weather situation, the operator removes the lightweight cover from its stowed position and rolls it onto the vehicle in the appropriate configuration. After ensuring that the cover is securely installed onto the vehicle, the operator may then re-enter the vehicle (or take nearby cover if available) and activate the inflation mechanism via a remote control. An internal sensor in the inflation mechanism detects when the volume of the air in the cover is at its optimum level and automatically shuts off the inflation mechanism. The inflation process takes less than a minute. The operator may then monitor his or her surroundings from inside the vehicle through transparent portions of the cover, generally in the location of the existing windows of the vehicle. Finally, once the storm has subsided, the operator may then emerge from the vehicle through the resealable entry port and reverse the process.

In summary, then, the inflatable vehicle cover of the present invention may be used in a variety of emergency situations where immediate protection of the vehicle is required, such as in a severe thunderstorm or hail storm. The present invention thus provides a solution to a long-unsolved problem, that of providing emergency protection for the body of a vehicle.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
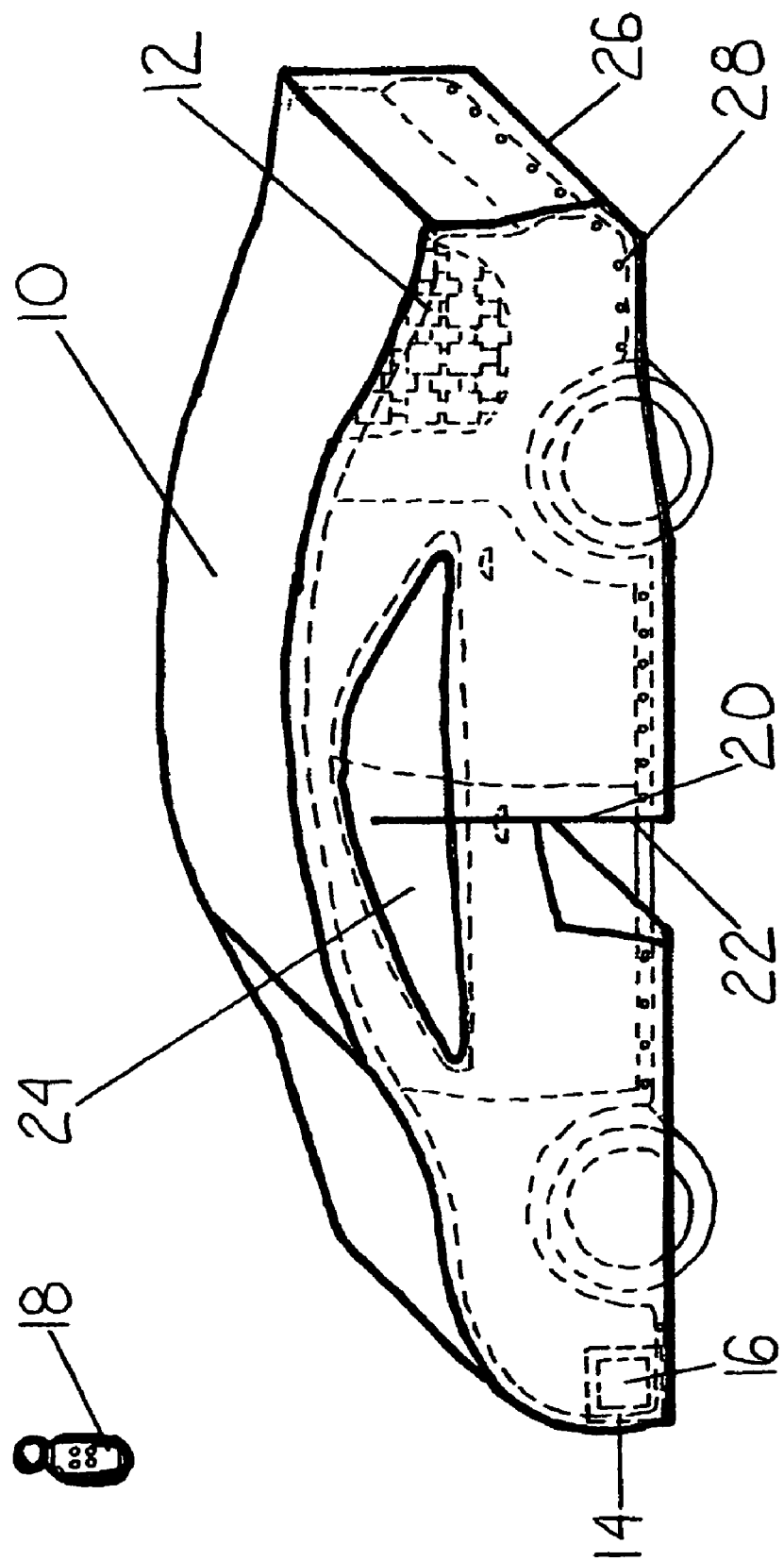
FIG. 1 is a perspective view of the present invention installed on a vehicle.

Referring to FIG. 1, the inflatable vehicle cover (10) in its preferred embodiment is installed to a motor vehicle. Cover (10) is constructed as an inflatable bladder, which when inflated, substantially conforms to the outer shape of all but the underside of a vehicle. Cover (10) is constructed in a one-piece bladder fashion, heat welded at the edges for an airtight seal. Cover (10) is also heat welded at particular points throughout the body to form a plurality of individual air pockets (12), all in fluid communication with one another. In its preferred embodiment, cover (10) is constructed of a thin, nylon-based material. The innermost surface of cover (10) is to be configured in a knitted fashion so as to provide a soft surface in contact with the outer surface of a vehicle, such as knitted nylon. Alternatively, outer cover (10) may be fashioned of other materials as well including, but not limited to, polyester, polypropylene, acrylic, or such other light weight material as will render the cover an easily manageable size and weight.

Still referring to FIG. 1, cover (10) incorporates integrated compartment (14) to house removable inflation device (16), which snaps into compartment (14) allowing fluid communication of device (16) with the interior of cover (10). In its most preferable form, device (16) is a battery powered air pump; however, it is also contemplated that device (16) may be powered via the vehicle's power unit as well. Device (16) may be manually controlled or controlled remotely via control unit (18). Control unit (18) may be one of any of the known varieties of remote control technology, such as wired, infrared, or others as known in the art.

In addition to the foregoing, still referring to FIG. 1, cover (10) incorporates entry port (20) to allow entrance and exit of the vehicle during or after full deployment of cover (10). Entry port (20) is preferably a slit in the general area of the driver's side door of a motor vehicle. Entry port (20) is resealable via fastening mechanism (22). Fastening mechanism (22) is preferably an industrial hook and loop fastening strip; however, other fastening means such as a zipper or snaps are contemplated as well. Cover (10) is also supplied with transparent regions (24) to allow visual inspection of the environment by an operator that has reentered the motor vehicle. Finally, cover (10) incorporates band member (26) and attachment mechanisms (28) for quickly and efficiently securing cover (10) to a motor vehicle in an emergency situation. Band member (26) is preferably comprised of an elasticized band or the like, and attachment mechanisms (28) are preferably magnetic members. Optionally, band member (26) may be comprised of a cable member and locking mechanism for securing cover (10) onto a vehicle for longer periods of time, such as overnight when severe weather is eminent.

In operation, cover (10) will be lightweight and small enough to stow in the trunk, tool box, or behind the seat of a vehicle. As the operator becomes aware of an impending hail storm or other hazardous weather situation, the operator removes cover (10) from its stowed position and rolls it onto the vehicle in the appropriate configuration. After ensuring that the cover is securely installed onto the vehicle via band member (26) and attachment members (28), the operator may then re-enter the vehicle via entry port (20) and reseal the opening in cover (10) using fastening mechanism (22) (or take nearby cover if available) and activate the inflation device (16) via a remote control (18). An internal sensor in inflation device (16) detects when the volume of air in cover (10) is at its optimum level and automatically shuts off device (16). The inflation process takes less than a minute. The operator may then monitor his or her surroundings from inside the vehicle through the transparent regions (24) in cover (10), generally in the location of the existing windows of the vehicle. Finally, once the storm has subsided, the operator may then emerge from the vehicle through the resealable entry port (20) and reverse the process.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. An emergency vehicle shelter, comprising:
an inflatable cover comprising multiple pockets in fluid communication with each other and with an integrated compartment, the pockets of the cover configured for nested engagement against a body of a vehicle; and
an inflation device configured for removable placement in the integrated compartment of the cover, the inflation device configured to fully inflate the cover within one minute, the integrated compartment configured to receive and hold the inflation device;
wherein the cover further comprises an entry port configured to provide an operator with access to the vehicle through the cover, the entry port being re-sealable via a fastener.

2. The shelter of claim 1, wherein the cover further comprises one or more magnets along a perimeter of the cover, the one or more magnets configured to hold the cover tightly against a bottom of the body of the vehicle.

3. The shelter of claim 2, further comprising a band member attached to the perimeter of the cover, the band member configured to secure the cover to the vehicle.

4. The shelter of claim 1, wherein the inflation device is powered by a battery.

5. The shelter of claim 1, wherein the inflation device is configured to automatically shut off upon detecting that the cover has inflated to a specified pressure.

6. The shelter of claim 1, wherein the inflation device is operated using a remote control unit.

7. The shelter of claim 1, wherein the cover further comprises one or more substantially transparent regions.

8. The shelter of claim 1, wherein the inflation device is powered by the vehicle.

* * * * *